Sept. 1, 1931.  J. J. McBRIDE  1,821,104
TRUCK FOR RAILWAY CARS
Filed May 2, 1929.   3 Sheets-Sheet 1
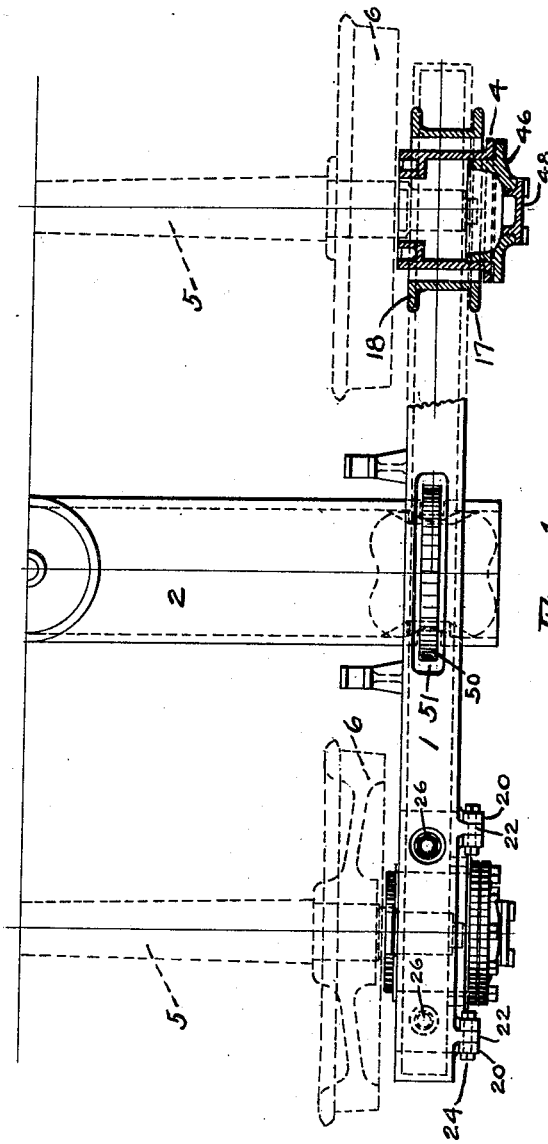
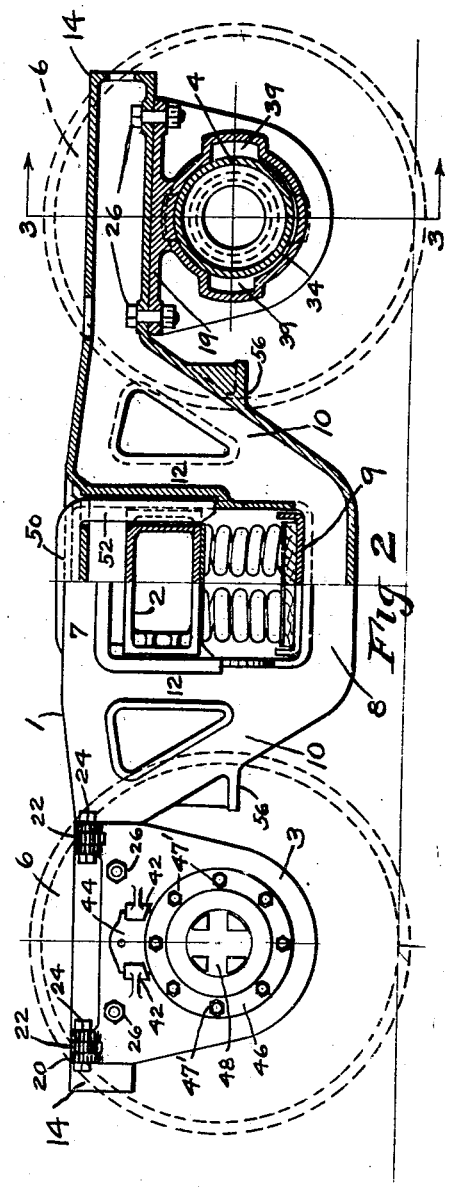
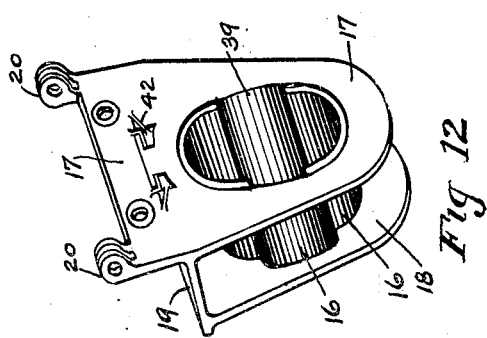
John J. McBride
INVENTOR

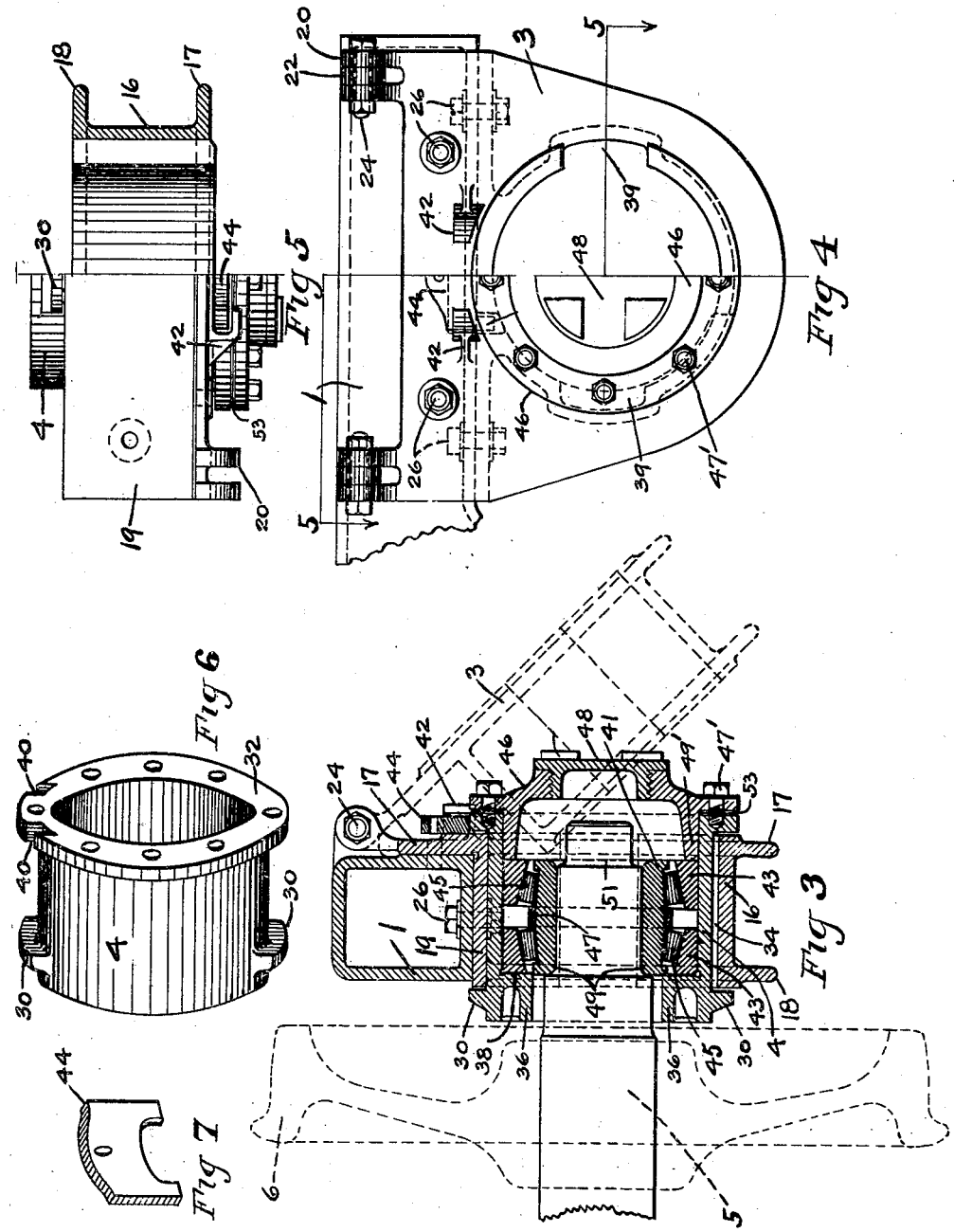

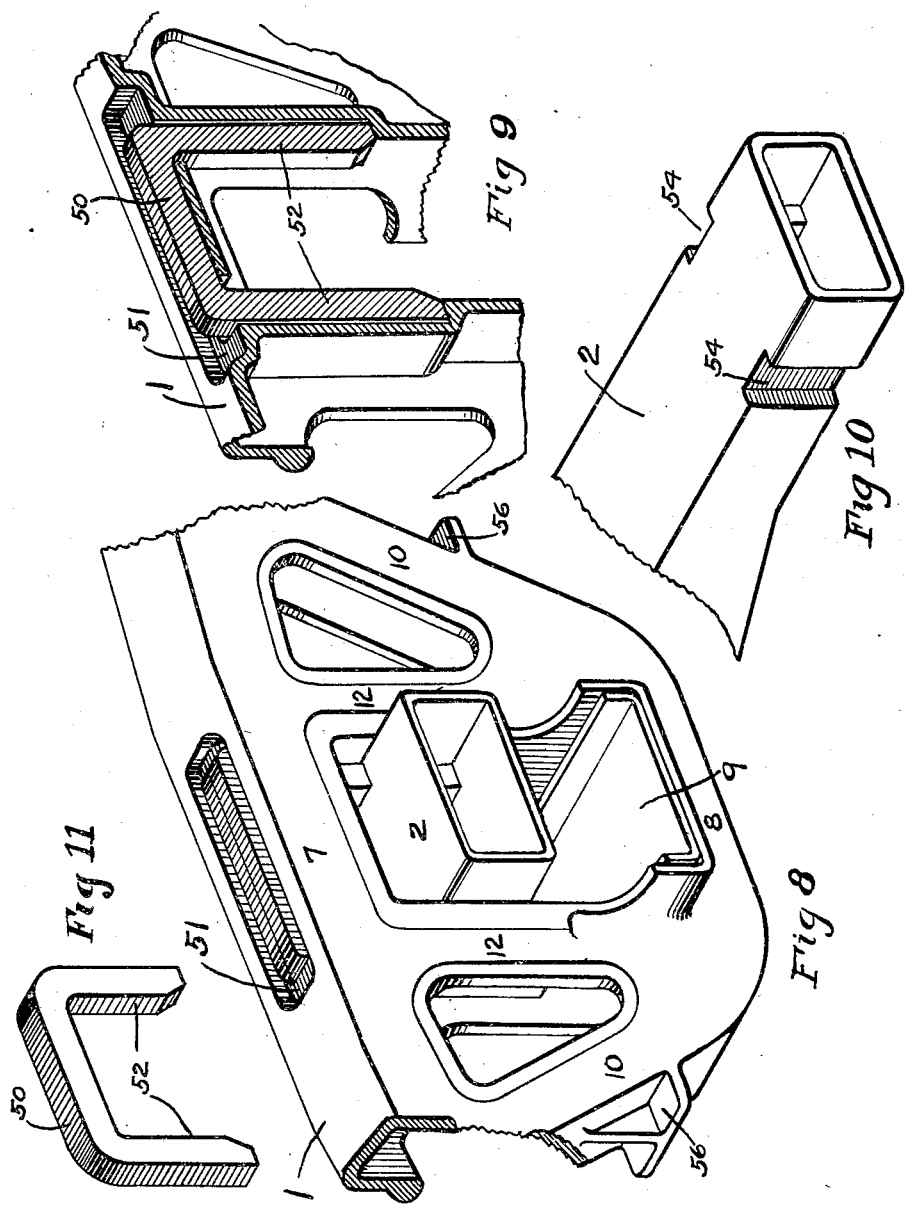

Patented Sept. 1, 1931

1,821,104

UNITED STATES PATENT OFFICE

JOHN J. McBRIDE, OF BAYONNE, NEW JERSEY

TRUCK FOR RAILWAY CARS

Application filed May 2, 1929. Serial No. 359,872.

This invention relates generally to trucks for railway cars and has particular reference to side frames for such trucks.

One object of this invention is the provision of a roller-bearing equipped car-truck.

Another object of the invention is the provision of means for supporting a roller-bearing journal box.

Still another object of the invention is the provision of a car-truck side frame having releasable pedestals whereby to permit the easy removal of a journal box therefrom and to permit the easy removal of car wheels from the truck without necessitating the removal of the truck from beneath the car.

Still another object of the invention is the provision of a car-truck side frame having releasable pedestals whereby to permit the easy removal of a journal box therefrom and to permit the easy removal of car wheels from the truck.

A further object of the invention is the provision of a car-truck side frame having pedestals hingedly secured thereto.

The invention also contemplates the provision of a car-truck side frame having a new and improved type of pedestal associated therewith.

Another object of the invention is the provision of a car-truck and pedestal, the latter being so formed as to permit the easy and quick removal of a journal box therefrom.

The invention also contemplates a new and improved means of guiding a truck bolster.

Other objects and advantages of this invention will be apparent from the following description taken in conjunction with the accompanying drawings in which:

Figure 1 is a plan view of a portion of a car truck, more particularly about one-half thereof, certain parts being shown in section and others broken away;

Fig. 2 is a side view of the truck part shown in Fig. 1 showing one of the side frames, the right half thereof being shown in section;

Fig. 3 is a sectional view taken on the line 3—3, Fig. 2;

Fig. 4 is a side elevation of one of the pedestals, certain parts being omitted to more clearly disclose the invention;

Fig. 5 is in part a top plan view and in part a section on the line 5—5, Fig. 4;

Fig. 6 is a perspective view of one of the journal boxes;

Fig. 7 is a perspective view of the journal box key;

Fig. 8 is a fragmentary perspective view of one of the side frames of the truck, showing a truck bolster associated therewith;

Fig. 9 is a sectional view of a portion of the truck side frame showing the bolster guide therein;

Fig. 10 is a perspective view of one end of the truck bolster;

Fig. 11 is a perspective view of the bolster guide; and

Fig. 12 is a perspective view of a truck pedestal.

Referring now more in detail to the drawings in which similar characters of reference designate similar parts in the several views, the car truck of the present invention includes spaced side frames, as is usual, but inasmuch as the parts at each side of the truck are identical, only one side is shown and described, it being understood that a description of one will suffice for both. The truck includes the side frames indicated generally at 1, a bolster 2, pedestals 3, which latter mount journal boxes indicated generally at 4 and in which journal boxes the ends of axles 5 are received; the axles carrying the car wheels 6. The drawings show the side frame as of truss type, but this is merely by way of example, as obviously the invention shown and claimed may be applied to any preferred or desired type of side frame, and it is to be understood that the present invention is not restricted to a truss frame. The side frame shown in the drawings comprises a casting having a top chord 7, a bottom chord 8, diagonals 10 and upright connecting struts 12 which join the upper and lower chords and define between them a bolster receiving opening; the bottom chord 8 serving also to support the spring plank shown in the drawings at 9. The frame 1 is preferably a hollow casting and includes the box section ends 14 to which the pedestals 3 are detachably and hingedly secured, as hereinafter more particularly pointed out.

The specific construction of the pedestals is clearly shown in Fig. 12 and they each comprise a single casting having a tubular journal box receiving body portion 16 and front and rear face plates 17 and 18, respectively, at the ends of the body portion and connected at the upper portions thereof by a bearing plate 19 adapted to underlie the box section ends of the side frame as shown clearly in Fig. 3. The plate 17 is greater in height than plate 18 to lie adjacent the front face of the box section end (also as shown in Fig. 3) and is provided with spaced pairs of hinge lugs 20 which are connected to lugs 22 on the ends 14 by pins 24 whereby, in the absence of other conditions, the pedestals may be swung, as shown in dotted lines in Fig. 3, so that the axles 5 may be free to permit removal of the wheels. Under normal conditions, the pedestals are secured to the ends 14 by bolts 26 (see Fig. 2 or 3).

The cylindrical body portion 16 is of such size as to receive the journal box 4, which is substantially cylindrical, as shown clearly in Fig. 6, and which is provided adjacent its rear end with diametrically opposed lugs 30 and at its forward edge with a circumferential flange 32. The body portion 16 is so formed that the journal box is accurately fitted therein, but is of such dimensions as to permit a slight clearance 34 between the bottom of the journal box and the pedestal when the parts are assembled in normal position (see Fig. 2 or 3). The rear end of the journal box 4 is provided with an internal flange 36 (see Fig. 3) which defines an inner shoulder 38 which serves as a stop or abutment to position a bearing assembly, indicated generally at 37, of any preferred type. In this connection, the specific type of bearing assembly forms no part of the present invention, as any preferred or desired type of assembly may be employed. In the instance shown herein, as an example, a bearing assembly is shown in Fig. 3 in order to indicate the application thereof, and said assembly comprises an inner race 41 and spaced outer races 43; two sets of bearings 45 being interposed between the inner and outer races. Intermediate the bearings a spacer ring 47 is arranged, the latter being mounted on the inner race and being shiftable thereon as will be pointed out hereinafter. As shown clearly in Fig. 3, one of the outer races abuts against the shoulder 38 and the inner race is so formed as to be positioned by a shoulder 49 formed at the reduced end of the axle.

As before mentioned, the journal box is received within the pedestal and the body portion 16 encompasses the same. To permit the insertion of the journal box, the inner surface of the body portion of the pedestal is provided with diametrically opposed slots 39 on each side of the vertical plane through the center of the pedestal through which slots the lugs 30 pass when the journal box is inserted. The lugs 30 pass completely through the pedestal body portion, and the journal box is then rotated to the position shown in Fig. 3 to place the slots 40 in the flange 32 in line with spaced retaining lugs 42 formed on the pedestal, as shown in Figs. 4 and 5. The journal box is maintained in the position shown in Fig. 3 by means of a key 44 which is inserted into the slots 40 through the lugs 42. The open end of the journal box is normally closed by a lid 46 having an opening therein which is normally closed by a cap or plug 48; the lid being bolted or otherwise secured to the box as shown at 47'. The lid 46 is provided with an annular flange 49' which preferably contacts with the inner surface of the journal box (see Fig. 3) and the end thereof defines an annular abutment 51 for engaging against the adjacent outer race; the bearing assembly thus being positioned in the journal box against endwise shifting. Between the box 4 and the lid 46, shims 53 are placed, and it will be apparent that the bearing assembly may be adjusted to compensate for wear or for any other purpose by adding or removing shims.

The side frame of the present invention also contemplates a novel means for guiding the bolster 2, and the upper chord 7 of the frame 1 is provided with a recess 51 arranged over the bolster opening and provided adjacent each end with apertures which communicate with vertical pockets formed in the struts 12. For guiding the bolster a U-shaped guide element 50 is provided, the legs 52 of which are extended through the openings in the recess 51 and are arranged in the pockets in the struts 12, as clearly shown in Fig. 9. The guide element 50 is supported in the recess and the legs 52 of said guide element are adapted to engage within oppositely formed slots 54 formed adjacent the end of the bolster whereby the bolster is guided in its vertical movement by the legs 52 of the guide element 50.

Preferably formed integral with the diagonals 10 of the side frame are jack pads 56, as clearly shown in Fig. 8.

From the above description it is believed that the construction of the side frame and truck of the present invention will be fully apparent to those skilled in the art. Normally, the parts assume the position shown in full lines in Fig. 2 with the journal box in the pedestal. To remove the journal box for purposes of inspection, or for any other desired reason, one (or both) ends of the side frame may be lifted by jacking the frame at the pads 56, thereby relieving strain between the journal boxes and pedestals. The key 44 is then withdrawn from its locking engagement and, with the arrangement shown, the journal box may then be rotated within the pedestal body portion until the lugs 30 aline with the slots 39, whereupon the journal box may be withdrawn from the pedestal. It is to be noted that the pedestal need not be disturbed in its connected relation with the side frame. If, after the journal box has been removed, it is deemed necessary to remove the wheels, the bolts 26 are removed whereupon the pedestal may be swung on its hinge 24 as shown in dotted lines in Fig. 3 and the wheels removed.

The drawings herein illustrate the preferred embodiment of the invention, but it is to be understood that these drawings are for illustrative purposes only and merely show one embodiment of the invention, as it is obvious that various changes in the form and proportions of the device may be made within the scope of the appended claims without departing from the spirit of the invention.

What is claimed is:

1. In a truck for railway cars, a side frame having pedestals hingedly secured to the ends thereof on an axis parallel to the longitudinal axis of the side frame.

2. In a railway car truck, a side frame, and a pedestal hingedly secured to each end thereof for swinging movement in a vertical arc the axis of which is substantially parallel to the longitudinal axis of the side frame.

3. In a railway car truck, a side frame, a pedestal hingedly secured to each end thereof to swing in a vertical arc the axis of which is substantially parallel to the longitudinal axis of the side frame, and means normally connecting the side frame and pedestal to prevent relative movement therebetween.

4. In a railway car truck, a side frame, journal boxes receiving the ends of car axles, and pedestals hingedly secured to the ends of the side frame and in which the journal boxes are removably mounted, said pedestals being swingable in a vertical arc away from the longitudinal axis of the side frame after the removal of the journal boxes, to clear the car axles.

5. In a railway car truck, a side frame, and a pedestal at each end thereof, said pedestals each comprising a body portion adapted to wholly confine a journal box, and face plates at the ends thereof, one of said face plates being hingedly secured to the side frame whereby the pedestal may be swung in a vertical arc.

6. A side frame for car trucks comprising a main portion and oppositely extending ends, and a pedestal at each end comprising a substantially cylindrical body portion for receiving a journal box, front and rear face plates at the front and rear ends of said body portion, means connecting said plates adjacent the upper ends thereof to define a supporting plate adapted to underlie and support the adjacent end of the side frame, and means hingedly connecting the pedestal with the side frame to permit the pedestal to swing on a vertical arc.

7. In a railway car truck, a side frame having oppositely extending box section ends, a pedestal underlying each end and hingedly secured to the front faces of said ends to be swung in a vertical arc, said pedestals each including a substantially cylindrical journal box receiving portion, a cylindrical journal box in said journal box receiving portion and provided with an annular flange at its rear end defining an internal shoulder, and a lid normally closing the front end of the journal box and having an annular flange defining an internal abutment, the journal box being adapted to receive a bearing assembly and said internal abutments defining positioning elements for said bearing assembly.

8. A pedestal for railway car trucks comprising a cylindrical journal box receiving portion, face plates at the ends of said portion, a shelf connecting the face plates adjacent the upper ends thereof and formed integral with the journal box receiving portion, one of said face plates having an upper extension provided with hinge lugs.

9. A railway car truck comprising a side frame having oppositely extending end portions, a pedestal underlying each end portion and hingedly secured thereto to be swung in a vertical arc away from the longitudinal axis of the side frame, said pedestals each including a substantially cylindrical body portion, a journal box in said body portion, and means locking the journal box in said body portion.

10. A railway car truck comprising a side frame having oppositely extending end portions, a pedestal underlying each end portion, said pedestals each comprising a body portion having diametrically opposed slots extending from end to end, a journal box having oppositely arranged lugs at one end thereof adapted to enter the slots in the said body portion and to pass therethrough, said journal box being adapted to be rotated in the body portion to place the lugs out of alinement with the slots after the lugs have passed therethrough, means locking the journal box against rotation in the pedestal, said journal box being adapted to receive the end of a car axle, and hinge means connecting the pedestal to the side frame and permitting swinging movement, whereby after removal of the journal box the pedestal may be swung in a vertical arc away from the car axle the axis of the arc being substantially parallel to the longitudinal axis of the side frame.

11. In a railway car truck, a side frame, car axles and wheels, means adapted to receive a bearing assembly for supporting the axles comprising a cylindrical journal box having an internal shoulder at its rear end and a combined adjustable lid and shoulder at its forward end for closing said forward end, and a pedestal hingedly secured to the side frame to swing in a vertical arc the axis of which is substantially parallel to the longitudinal axis of the side frame and in which said journal box is removably secured.

12. In a railway car truck, a side frame, and a pedestal hingedly secured to each end thereof to swing on an axis substantially parallel to the longitudinal axis of the side frame, said pedestals being so formed internally as to substantially wholly confine a journal box and provide a clearance between portions of said box and the pedestal to permit relative movement between the pedestal and journal box upon elevation of the adjacent end of the frame.

13. In a railway car truck, a side frame, and a pedestal hingedly secured to each end thereof to swing on an axis substantially parallel to the longitudinal axis of the side frame, said pedestals being so formed internally as to substantially wholly confine a journal box and provide a clearance between portions of said box and the pedestal to permit upward movement of the pedestal with respect to the journal box whereby to relieve the latter of the weight of the frame.

14. In a railway car truck, a side frame, and a pedestal at each end thereof the interior of which is substantially cylindrical for the major portion thereof whereby to position a substantially cylindrical journal box, the latter carrying the weight of the frame when the parts are in normal assembled position, the interior of the pedestal at the lower end thereof being slightly enlarged to permit vertical shifting of the pedestal relative to the journal box when the frame is elevated whereby the journal box may be freely rotated and removed from the pedestal.

15. In a railway truck, a side frame and a pedestal hingedly secured at each end thereof, to swing in a vertical arc, the axis of which is substantially parallel to the longitudinal axis of the side frame, said pedestals each being so formed internally as to substantially wholly confine a journal box and to be directly supported by said journal box and provide a clearance between portions of said box and the pedestals to permit upward movement of the pedestals with respect to journal box whereby to relieve the latter of the weight of the frame.

In witness whereof I have hereunto set my hand.

JOHN J. McBRIDE.